(12) United States Patent
Oiwa et al.

(10) Patent No.: US 8,648,991 B2
(45) Date of Patent: Feb. 11, 2014

(54) LIQUID CRYSTAL DISPLAY DEVICE

(75) Inventors: Mika Oiwa, Chiba (JP); Shintaro Takeda, Chiba (JP); Shinichi Komura, Mobara (JP)

(73) Assignee: Japan Display Inc., Tokyo (JP)

( * ) Notice: Subject to any disclaimer, the term of this patent is extended or adjusted under 35 U.S.C. 154(b) by 128 days.

(21) Appl. No.: 13/329,371

(22) Filed: Dec. 19, 2011

(65) Prior Publication Data

US 2012/0162560 A1   Jun. 28, 2012

(30) Foreign Application Priority Data

Dec. 24, 2010   (JP) .................................. 2010-286874

(51) Int. Cl.
*G02F 1/1343*   (2006.01)

(52) U.S. Cl.
USPC .............................. 349/141; 349/43; 349/151

(58) Field of Classification Search
USPC ............... 349/141, 139, 43, 65, 86, 151, 183, 349/168, 175, 185
See application file for complete search history.

(56) References Cited

U.S. PATENT DOCUMENTS

| 6,642,984 B1 * | 11/2003 | Yoshida et al. ................ 349/139 |
| 7,576,829 B2 | 8/2009 | Kikuchi et al. |
| 2011/0141424 A1 * | 6/2011 | Lee et al. ....................... 349/141 |

FOREIGN PATENT DOCUMENTS

| JP | 2006-343697 | 12/2006 |
| WO | WO 2005/090520 A1 | 9/2005 |

* cited by examiner

*Primary Examiner* — Thoi Duong
(74) *Attorney, Agent, or Firm* — Antonelli, Terry, Stout & Kraus, LLP.

(57) ABSTRACT

Provided is a liquid crystal display device, including: a first substrate including a first electrode and a second electrode each including a plurality of linear electrodes and formed so as to be comb-like; a second substrate; a blue-phase liquid crystal layer; first drain lines and second drain lines extending in Y direction and provided side by side in X direction; gate lines extending in the X direction; a first thin film transistor for supplying a drain signal from one of the first drain lines to the first electrode; a second thin film transistor for supplying a drain signal from one of the second drain lines to the second electrode, which is plate-like and formed on the blue-phase liquid crystal layer side of the second substrate so as to cover at least a region in which pixels are formed.

14 Claims, 8 Drawing Sheets

LIQUID CRYSTAL DISPLAY DEVICE

CROSS-REFERENCE TO RELATED APPLICATION

The present application claims priority from Japanese application JP 2010-286874 filed on Dec. 24, 2010, the content of which is hereby incorporated by reference into this application.

BACKGROUND OF THE INVENTION

1. Field of the Invention

The present invention relates to a liquid crystal display device, and more particularly, to a liquid crystal display device using a liquid crystal layer which exhibits a blue phase.

2. Description of the Related Art

In recent years, polymer stabilized blue-phase liquid crystal has been known, which enables high contrast and high-speed response. The polymer stabilized blue-phase liquid crystal exhibits optical isotropy when no voltage is applied thereto and exhibits a characteristic that the optical anisotropy thereof changes when an electric field is applied thereto. A liquid crystal display device described in International Patent Application WO2005/090520 is an example of a liquid crystal display device using the polymer stabilized blue-phase liquid crystal. According to the technology described in International Patent Application WO2005/090520, polymer stabilized blue-phase liquid crystal is sandwiched between a pair of transparent substrates. A pair of comb-like electrodes is formed on one of the transparent substrates. Gray scale signals (video signals, drain signals) corresponding to a display image are supplied to one of the pair of comb-like electrodes (pixel electrode), while a common signal which is a reference to the gray scale signals is supplied to the other (common electrode), and a liquid crystal display device of an in-plane switching (IPS) system in which an electric field in parallel with surfaces of the transparent substrates is applied is formed.

In such a liquid crystal display device using polymer stabilized blue-phase liquid crystal, in order to reduce the drive voltage, polymer stabilized blue-phase liquid crystal having a high permittivity anisotropy ($\Delta\epsilon$) is used. However, a liquid crystal layer having a high permittivity anisotropy is thought to be more liable to take in impurity ions, which is thought to be a cause of unsharp moving images and burn-in. A liquid crystal display device described in Japanese Patent Application Laid-open No. 2006-343697 is a liquid crystal display device which is capable of alleviating such an impurity ion imbalance. In the liquid crystal display device described in Japanese Patent Application Laid-open No. 2006-343697, when an image is to be displayed, the pixel electrode and the common electrode are caused to be at a same electric potential.

SUMMARY OF THE INVENTION

On the other hand, the inventors of the present invention have evaluated, in a liquid crystal display device of the IPS system in which the liquid crystal layer is formed of polymer stabilized blue-phase liquid crystal, the V-T characteristics between a voltage V applied to a pixel and a transmittance T of the pixel. It has been made clear that hysteresis is caused between the applied voltage V and the transmittance T. Further, it has been made clear that, as a result of evaluation of response characteristics, although the rise time is short, the fall time is relatively long.

One reason of such hysteresis caused and that the fall time is longer than the rise time is thought to be a very high viscosity of the liquid crystal. Further, in the process of, from a state in which an electric field is applied and the liquid crystal orientation state and the lattice structure are arbitrarily changed, returning the state to the original one by applying no voltage, one reason is thought to be dependence of the fall time on both the rate of change of the liquid crystal orientation and the rate of change of the lattice structure. Further, in the case of the polymer stabilized blue-phase liquid crystal, one reason is thought to be distortion of the lattice due to change in liquid crystal orientation with the application of an electric field.

The present invention has been made in view of those problems, and it is an object of the present invention to provide a technology for a liquid crystal display device using blue-phase liquid crystal which may compensate for hysteresis caused and delay in the fall time.

(1) In order to solve the above-mentioned problem, the present invention provides a liquid crystal display device, including: a first substrate including pixels arranged in matrix, the pixels each including a first electrode and a second electrode, the first electrode and the second electrode each including a plurality of linear electrodes and formed so as to be comb-like; a second substrate arranged so as to be opposed to the first substrate via a blue-phase liquid crystal layer; a backlight device for applying backlight from a rear surface side of the first substrate, the liquid crystal display device driving the blue-phase liquid crystal layer by an electric field developed between the first electrode and the second electrode; first drain lines extending in a Y direction and provided side by side in an X direction; second drain lines extending in the Y direction and provided side by side in the X direction; gate lines extending in the X direction and provided side by side in the Y direction; a first thin film transistor, which is provided in each of the pixels and includes a drain electrode connected to one of the first drain lines, for supplying a drain signal from the one of the first drain lines to the first electrode in synchronization with a scanning signal from one of the gate lines; a second thin film transistor, which is provided in each of the pixels and includes a drain electrode connected to one of the second drain lines, for supplying a drain signal from the one of the second drain lines to the second electrode in synchronization with a scanning signal from one of the gate lines; and a third electrode, which is plate-like and formed on a surface of the second substrate on the blue-phase liquid crystal layer side so as to cover at least a region in which the pixels are formed.

(2) In order to solve the above-mentioned problem, the present invention provides a liquid crystal display device, including: a first substrate including pixels arranged in matrix, the pixels each including a first electrode and a second electrode, the first electrode and the second electrode each including a plurality of linear electrodes and formed so as to be comb-like; a second substrate arranged so as to be opposed to the first substrate via a blue-phase liquid crystal layer; and a backlight device for applying backlight from a rear surface side of the first substrate, the liquid crystal display device driving the blue-phase liquid crystal layer by an electric field developed between the first electrode and the second electrode, in which: the second substrate includes a third electrode, which is plate-like and formed on the blue-phase liquid crystal layer side of the second substrate so as to cover at least a region in which the pixels are formed; and the liquid crystal display device further includes a drive circuit for modulating and driving the blue-phase liquid crystal layer by sequentially switching between: a first period during which the drive circuit applies voltages to the first electrode and the second electrode to develop an electric field in parallel with an in-plane direction of the first substrate, thereby modulating and driving the blue-phase liquid crystal layer correspondingly to a display image; and a second period during which the drive circuit applies substantially the same voltage to the first electrode and the second electrode and applies a predetermined voltage to the third electrode to develop an electric field in parallel with a normal to the first substrate, thereby modulating and driving the blue-phase liquid crystal layer.

According to the present invention, the liquid crystal display device using blue-phase liquid crystal may compensate for hysteresis caused and delay in the fall time.

Other effects of the present invention become apparent from the description of the whole specification.

DETAILED DESCRIPTION OF THE INVENTION

Hereinbelow, embodiments of the present invention to which the present invention is applied are described with reference to the drawings. Throughout the description, the same reference symbols denote components having the same function, and redundant description thereof is omitted.

[Embodiment 1]

Figure 1:
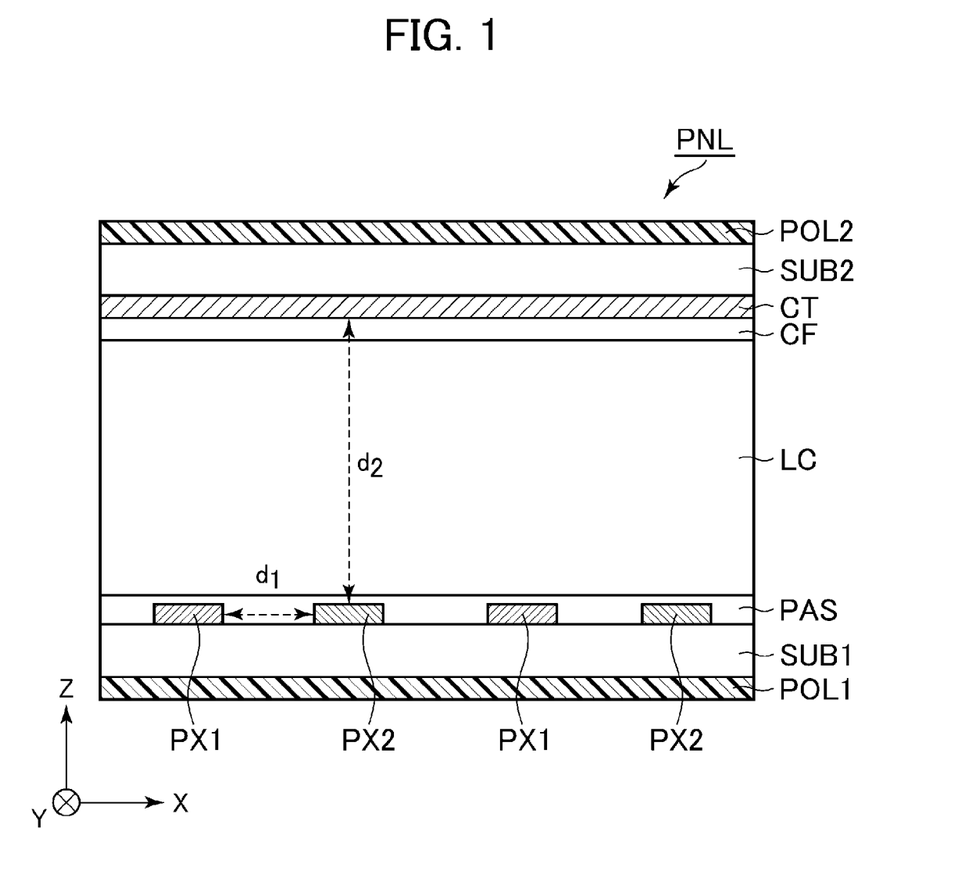
FIG. 1 is a sectional view illustrating a schematic structure of a liquid crystal display device according to Embodiment 1 of the present invention.

FIG. 1 is a sectional view illustrating a schematic structure of a liquid crystal display device according to Embodiment 1 of the present invention, and is a sectional view of a region in which pixels are arranged in matrix. Note that, X, Y, and Z in FIG. 1 denote an X axis, a Y axis, and a Z axis, respectively.

Further, thin film layers such as a first pixel electrode PX1 and a second pixel electrode PX2 maybe formed by a publicly known photolithography technology, and thus, detailed description of a formation method is omitted.

As illustrated in FIG. 1, the liquid crystal display device according to Embodiment 1 includes a liquid crystal display panel PNL which includes a first substrate SUB1, a second substrate SUB2, and blue-phase liquid crystal LC (blue-phase liquid crystal layer LC). The first substrate SUB1 includes the first pixel electrodes (first electrodes) PX1 and the second pixel electrodes (second electrodes) PX2 both of which are formed of a conductive film, and thin film transistors. The second substrate SUB2 is arranged so as to be opposed to the first substrate SUB1 and includes a common electrode (third electrode) CT which is formed of a transparent conductive film, and a color filter (colored layer) CF. The blue-phase liquid crystal LC is sandwiched between the first substrate SUB1 and the second substrate SUB2 and exhibits optical isotropy. As the blue-phase liquid crystal LC, for example, polymer stabilized blue-phase liquid crystal is used. By combining the liquid crystal display panel PNL with a backlight device (not shown) as alight source of the liquid crystal display panel PNL, the liquid crystal display device is formed. Note that, the backlight device maybe anyone of a direct type in which the light source is arranged on a rear surface side of the liquid crystal display panel PNL, a side light type in which a light guide plate is arranged on the rear surface side of the liquid crystal display panel PNL and the light source is arranged on a side wall portion of the light guide plate, and the like, insofar as the color tone enables desired white display.

The first substrate SUB1 and the second substrate SUB2 are fixed by a sealing material (not shown) applied to the periphery of the second substrate SUB2 so as to be ring-like, and the blue-phase liquid crystal LC is encapsulated between the first substrate SUB1 and the second substrate SUB2. Further, as the first substrate SUB1 and the second substrate SUB2, for example, well-known glass substrates are usually used as base members, but transparent insulating substrates made of a resin may also be used. Further, in the liquid crystal display device according to Embodiment 1, a region in which a plurality of display pixels (hereinafter, simply referred to as pixels) are formed within a region in which the blue-phase liquid crystal LC is encapsulated is a display region. Therefore, a region that is within the region in which the liquid crystal is encapsulated but that does not have a pixel formed therein and thus is not concerned with the display is not a display region. Note that, in the following description, in describing the liquid crystal display panel PNL, the liquid crystal display panel PNL may be sometimes referred to as a liquid crystal display device.

As illustrated in FIG. 1, with regard to each of the pixels, the first pixel electrode PX1 formed so as to have a plurality of linear electrodes extending in the Y direction and provided side by side in the X direction so as to be comb-like and the second pixel electrode PX2 formed, similarly to the first pixel electrode, so as to have a plurality of linear electrodes extending in the Y direction and provided side by side in the X direction so as to be comb-like are formed on the blue-phase liquid crystal LC side (opposed surface side) of the first substrate SUB1. The linear electrodes of the first pixel electrode PX1 and the linear electrodes of the second pixel electrode PX2 are alternately arranged side by side in the X direction. Note that, the first pixel electrode PX1 and the second pixel electrode PX2 are not necessarily required to be provided in a same layer, and, for example, the linear electrodes of the first pixel electrode PX1 and the linear electrodes of the second pixel electrode PX2 may be provided via an insulating film and alternately provided side by side in the X direction when seen from above. Further, in order to obtain the effects of the present invention, the materials of the electrodes of and the widths of the linear electrodes of the first pixel electrode PX1 and the second pixel electrode PX2 are not specifically limited, and, for example, the first pixel electrode PX1 and the second pixel electrode PX2 may be formed of a transparent conductive film of indium-tin-oxide (ITO) or the like.

Further, as described in detail in the following, the first pixel electrode PX1 is electrically connected to a source electrode of a first thin film transistor (not shown), and a first gray scale voltage is input via the first thin film transistor to the first pixel electrode PX1. Similarly, the second pixel electrode PX2 is connected to a source electrode of a second thin film transistor (not shown), and a second gray scale voltage is input via the second thin film transistor to the second pixel electrode PX2.

An insulating film PAS which is made of, for example, silicon nitride ($Si_3N_4$) that is an inorganic compound, is formed on the whole surface above the first pixel electrode PX1 and the second pixel electrode PX2. However, the insulating film PAS is not limited to a silicon nitride film, and a film made of other inorganic compounds such as silicon oxide ($SiO$ or $SiO_2$) may also be used. Further, the order of forming the first pixel electrode PX1, the second pixel electrode PX2, and the insulating film PAS is not limited to the order described above, and the first pixel electrode PX1 and the second pixel electrode PX2 may be formed above the insulating film PAS. Still further, in the liquid crystal display device according to Embodiment 1, the blue-phase liquid crystal LC is used, and thus an alignment film may be eliminated. However, in order to align lattice planes above the insulating film PAS, a publicly-known alignment film may be formed on one (or both) of a surface of the first substrate SUB1 on the blue-phase liquid crystal LC side and a surface of the second substrate SUB2 on the blue-phase liquid crystal LC side.

Meanwhile, the common electrode CT is formed on the blue-phase liquid crystal LC side of the second substrate SUB2 so as to cover at least the whole surface of the display region of the second substrate SUB2, and the color filter CF including red (R), green (G), and blue (B) colored layers is formed on the common electrode CT.

Further, in the liquid crystal display panel PNL according to Embodiment 1, a polarizing plate POL1 is arranged on a surface of the first substrate SUB1 which does not face the blue-phase liquid crystal LC, that is, a surface on the backlight device side of the liquid crystal display panel PNL. Further, a polarizing plate POL2 is arranged on a surface of the second substrate SUB2 which does not face the blue-phase liquid crystal LC, that is, a surface on an image display side of the liquid crystal display panel PNL. The polarizing plate POL1 on the backlight device side and the polarizing plate POL2 on the image display side are arranged so that the polarization direction forms an angle of 90°, that is, so that so-called crossed Nicoles (orthogonal Nicoles) are formed.

Still further, when a distance between the first pixel electrode PX1 and the second pixel electrode PX2 which are adjacent to each other is d1 and a distance between the first and second pixel electrodes PX1 and PX2 and the common electrode CT is d2, it is preferred that the distance d2 between the first and second pixel electrodes PX1 and PX2 and the common electrode CT be larger than the distance d1 between the first pixel electrode PX1 and the second pixel electrode PX2. This is because, by causing the distance d2 to be larger than the distance d1, a lateral electric field which is effective in, when a gray scale voltage for displaying an image is applied to the first pixel electrode PX1 and the second pixel electrode PX2, displaying the image may be obtained.

Figure 2:
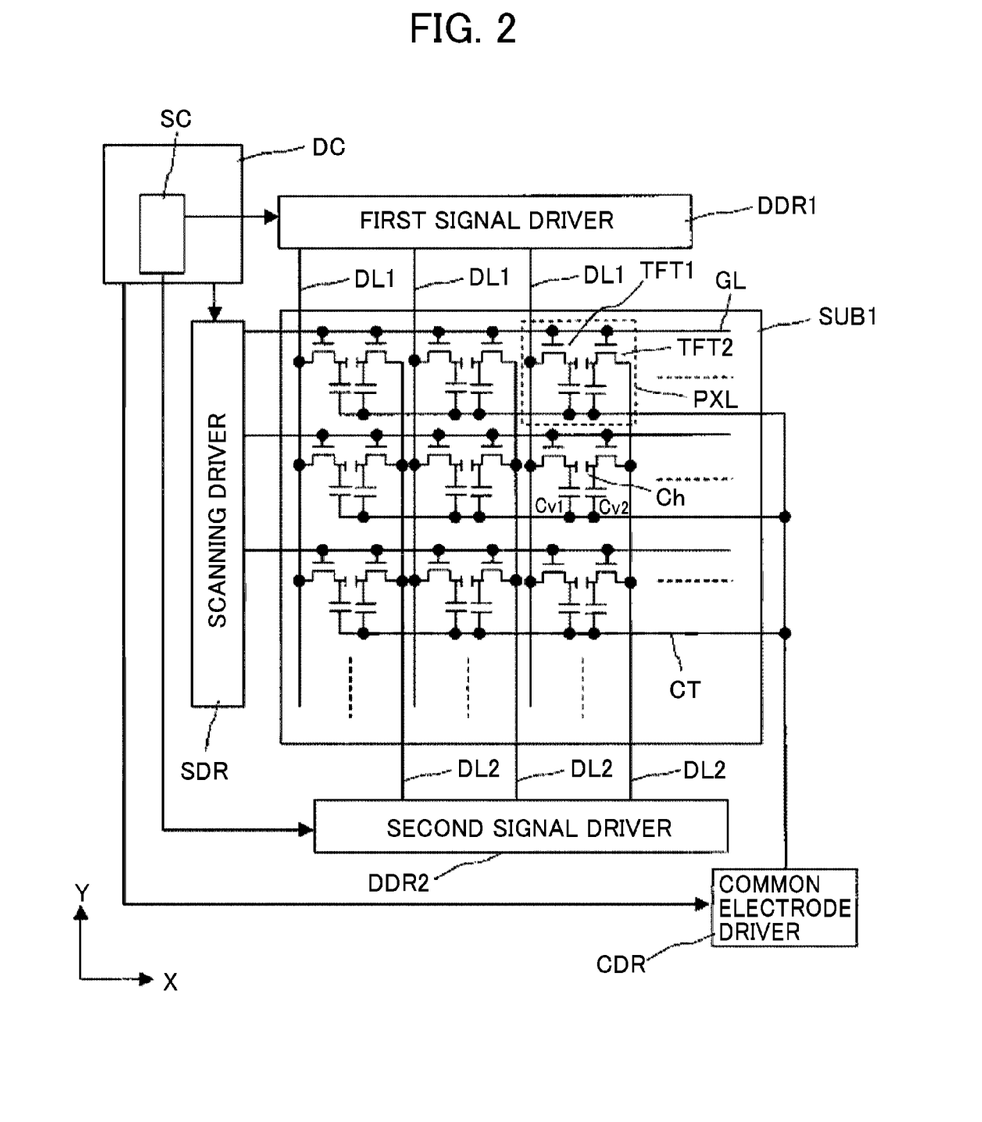
FIG. 2 is an explanatory view of an equivalent circuit of pixels and of a schematic structure of a drive system in the liquid crystal display device according to Embodiment 1.

FIG. 2 is an explanatory view of an equivalent circuit of the pixels and of a schematic structure of a drive system in the liquid crystal display device according to Embodiment 1 of the present invention. Note that, a capacitor Ch is a circuit element equivalent to the blue-phase liquid crystal between the pair of first pixel electrode PX1 and second pixel electrode PX2 which are arranged in a same pixel and which are formed so as to be comb-like . A capacitor Cv1 is a circuit element equivalent to the blue-phase liquid crystal between the first pixel electrode PX1 and the common electrode CT, and a capacitor Cv2 is a circuit element equivalent to the blue-phase liquid crystal between the second pixel electrode PX2 and the common electrode.

As illustrated in FIG. 2, the liquid crystal display device according to Embodiment 1 includes, for example, on the first substrate SUB1 thereof, first drain lines (first video signal lines) DL1 and second drain lines (second video signal lines) DL2 extending in the Y direction (column direction) and provided side by side in the X direction (row direction) and gate lines (scanning signal lines) GL extending in the X direction and provided side by side in the Y direction. In the liquid crystal display device according to Embodiment 1 structured in this way, for example, a region surrounded by two adjacent first drain lines DL1 and two adjacent gate lines GL (region surrounded by dotted lines) forms one pixel PXL, and a plurality of pixels PXL are arranged along the first drain lines DL1 and the gate lines GL in matrix in the display region.

Two thin film transistors, that is, a first thin film transistor TFT1 and a second thin film transistor TFT2, are arranged in each pixel PXL. A drain electrode of the first thin film transistor TFT1 is connected to the first drain line DL1 while a drain electrode of the second thin film transistor TFT2 is connected to the second drain line DL2. Here, gate electrodes of the first thin film transistor TFT1 and the second thin film transistor TFT2 in each pixel are connected to a same gate line GL. Further, gate electrodes of the first thin film transistors TFT1 and the second thin film transistors TFT2 of the pixels PXL arranged in the X direction are all connected to the same gate line GL. The first thin film transistor TFT1 is arranged in proximity to a point of intersection of the first drain line DL1 and the gate line GL, while the second thin film transistor TFT2 is arranged in proximity to a point of intersection of the second drain line DL2 and the gate line GL. Note that, as the first thin film transistor TFT1 and the second thin film transistor TFT2, for example, a thin film transistor a semiconductor layer of which is an amorphous silicon layer, a low temperature polysilicon layer, a microcrystalline silicon layer, or the like which is well known, or an amorphous oxide semiconductor (IGZO) may be used.

In the liquid crystal display panel according to Embodiment 1 structured in this way, the first thin film transistor TFT1 and the second thin film transistor TFT2 arranged in the same row in the X direction take in a drain signal from the first drain line DL1 and the second drain line DL2 connected thereto, respectively, in synchronization with a gate signal from the gate line GL. Here, as described in detail in the following, when a reference voltage in liquid crystal display is output to the first drain line DL1 and a gray scale voltage corresponding to image display is output to the second drain line DL2, the reference voltage is supplied to the first pixel electrode PX1 to which the source electrode of the first thin film transistor TFT1 is connected, and the gray scale voltage is supplied to the second pixel electrode PX2 to which the source electrode of the second thin film transistor TFT2 is connected in synchronization with the gate signal. As a result, an electric field (lateral electric field or horizontal electric field) between the first pixel electrode PX1 corresponding to the first thin film transistor TFT1 and the second pixel electrode PX2 corresponding to the second thin film transistor TFT2, which is in parallel with an in-plane direction of the first substrate SUB1, is applied to the blue-phase liquid crystal LC (the capacitor Ch which is the circuit element equivalent to the blue-phase liquid crystal LC) to drive the blue-phase liquid crystal LC.

Meanwhile, when a gray scale voltage of a same voltage level corresponding to the image display is output to the first drain line DL1 and the second drain line DL2, the gray scale voltage of the same voltage level is supplied to the first pixel electrode PX1 corresponding to the first thin film transistor TFT1 and the second pixel electrode PX2 corresponding to the second thin film transistor TFT2 in synchronization with the gate signal. As a result, the first pixel electrode PX1 and the second pixel electrode PX2 are at the same voltage level, that is, an electric field (lateral electric field) which is in parallel with the in-plane direction of the first substrate SUB1 is not applied.

Further, in the liquid crystal display device according to Embodiment 1, the second substrate SUB2 includes the common electrode CT. This enables application of an electric field between the first pixel electrode PX1 corresponding to the first thin film transistor TFT1 and the common electrode CT and between the second pixel electrode PX2 corresponding to the second thin film transistor TFT2 and the common electrode CT. In the liquid crystal display device according to Embodiment 1, the first substrate SUB1 and the second substrate SUB2 are arranged so as to be opposed to each other with the blue-phase liquid crystal LC therebetween, and thus an electric field (longitudinal electric field or vertical electric field) in the out-of-plane direction of the first substrate SUB1 and the second substrate SUB2, that is, in a direction of the normal to the first substrate SUB1 and the second substrate SUB2 may be applied to the blue-phase liquid crystal LC (the capacitors Cv1 and Cv2 equivalent to the blue-phase liquid crystal LC).

Further, the liquid crystal display device according to Embodiment 1 includes a drive circuit (driver circuit). The drive circuit includes a scanning driver (scanning line drive circuit) SDR for supplying a signal to the respective pixels, a first signal driver (first drain line drive circuit) DDR1 for supplying a first video signal (first drain signal), a second signal driver (second drain line drive circuit) DDR2 for supplying a second video signal (second drain signal), and a common electrode driver (common electrode drive circuit) CDR for supplying a voltage which is the same as the reference voltage to the common electrode CT. Further, the liquid crystal display device according to Embodiment 1 includes a display control circuit DC for controlling operation of the liquid crystal display panel according to Embodiment 1 based on a video signal (not shown) from outside. The display control circuit DC includes a signal control circuit SC to further control the common electrode driver CDR and the scanning driver SDR. The signal control circuit SC controls signals to be sent to the first signal driver DDR1 and the second signal driver DDR2.

Note that, in the liquid crystal display device according to Embodiment 1, for example, the above-mentioned drive circuits and control circuits are mounted on a flexible printed circuit board FPC by a tape carrier method or a chip on film (COF) method, and the respective drive signals are input via connecting portions (not shown) provided on the first substrate SUB1, but the present invention is not limited thereto. Those drive circuits may be formed of semiconductor chips, and a part or the whole thereof may be mounted on the first substrate SUB1. Further, the drive circuits may be directly formed on the first substrate SUB1 together with the first thin film transistor TFT1 and the second thin film transistor TFT2.

As described above, the liquid crystal display panel according to Embodiment 1 includes two switching elements, that is, the first thin film transistor TFT1 and the second thin film transistor TFT2, and arbitrary voltages may be applied to the three electrodes, that is, the first pixel electrode PX1, the second pixel electrode PX2, and the common electrode CT, respectively. This enables formation of arbitrary electric field distribution among the three electrodes, that is, the first pixel electrode PX1, the second pixel electrode PX2, and the common electrode CT. As a result, the direction of the electric field applied to the blue-phase liquid crystal LC may be controlled, and the drive may be carried out with the direction of the electric field being changed between gradation change when the voltage applied to the blue-phase liquid crystal LC becomes higher (that is, on the rising edge) and gradation change when the voltage becomes lower (that is, on the falling edge). However, it is preferred that, as described in detail in the following, electric field distribution necessary for driving the liquid crystal be formed by applying an arbitrary same voltage to two among the three electrodes, that is, the first pixel electrode PX1, the second pixel electrode PX2, and the common electrode CT. By exercising control in this way, the direction of the electric field applied to the blue-phase liquid crystal LC to be described in detail in the following may be controlled with a simple structure, and the drive maybe carried out with the direction of the electric field being changed between gradation change when the voltage applied to the blue-phase liquid crystal LC becomes higher (on the rising edge) and gradation change when the voltage becomes lower (on the falling edge).

Figure 3A:
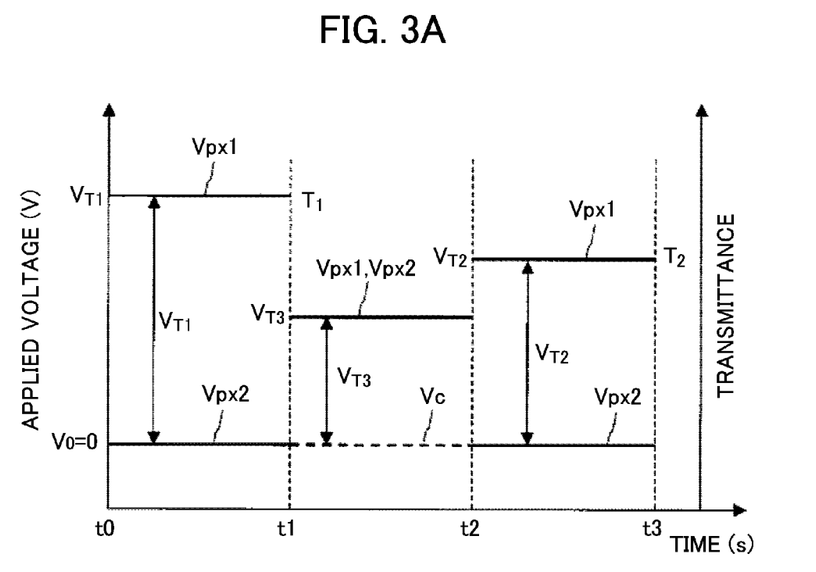
FIG. 3A is an explanatory view of operation when electric fields are applied in the liquid crystal display device according to Embodiment 1.
Figure 3B:
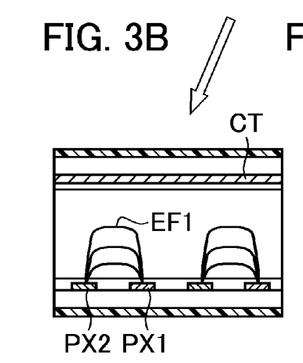
FIG. 3B is an explanatory view of operation when an electric field is applied in the liquid crystal display device according to Embodiment 1.
Figures 3C, 3D:
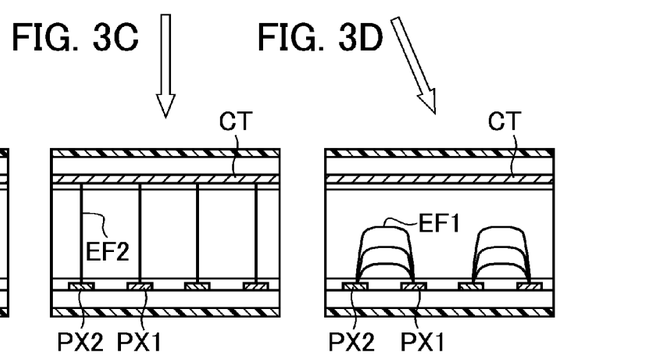
FIG. 3C is an explanatory view of operation when an electric field is applied in the liquid crystal display device according to Embodiment 1.
FIG. 3D is an explanatory view of operation when an electric field is applied in the liquid crystal display device according to Embodiment 1.
Figure 4:
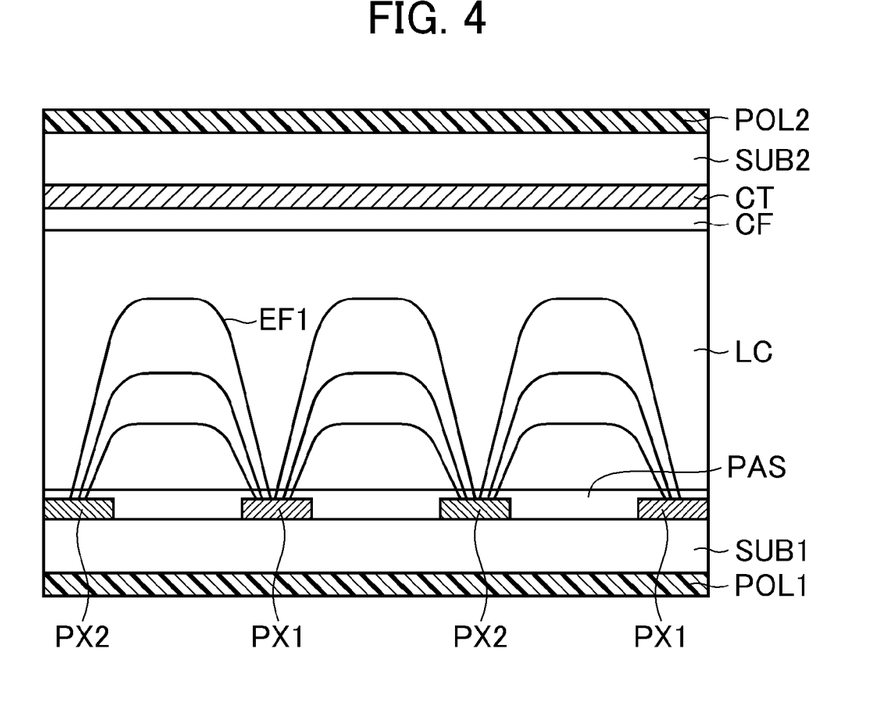
FIG. 4 is an enlarged view illustrating operation when a lateral electric field is applied in the liquid crystal display device according to Embodiment 1.
Figure 5:
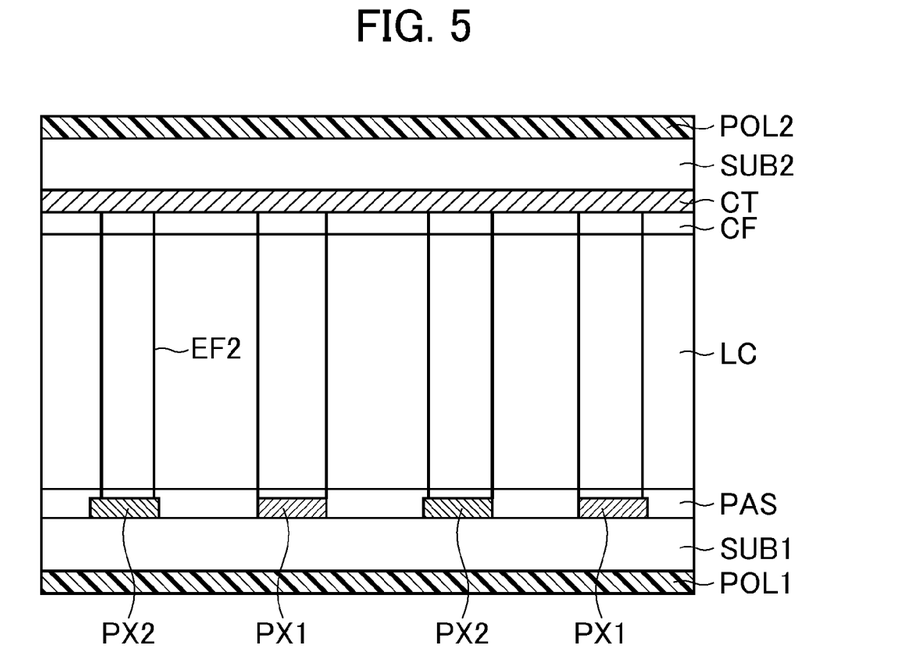
FIG. 5 is an enlarged view illustrating operation when a longitudinal electric field is applied in the liquid crystal display device according to Embodiment 1.

FIGS. 3A to 3D are explanatory views of operation when electric fields are applied in the liquid crystal display device according to Embodiment 1, FIG. 4 is an enlarged view illustrating operation when a lateral electric field is applied in the liquid crystal display device according to Embodiment 1, and FIG. 5 is an enlarged view illustrating operation when a longitudinal electric field is applied in the liquid crystal display device according to Embodiment 1. In the following, image display operation in the liquid crystal display device according to Embodiment 1 is described with reference to FIGS. 1 to 5. Note that, in the following description, as an example, operation in the pixel PXL surrounded by the dotted lines in FIG. 2 is described in detail. Further, in the following description, a case in which a reference voltage $V_0$ is $0$ (V) (zero volts) is described, but the present invention is not limited thereto. Further, in the following, operation is described in the case in which voltages applied to the respective pixel electrodes are higher than the reference voltage $V_0$, but it is enough that the electric potential differences between the common electrode and the respective pixel electrodes and the electric potential difference between the first pixel electrode and the second pixel electrode are the same, and frame inversion drive or the like may be carried out.

During a period from a time t0 to a time t1 (image display period or first period) illustrated in FIG. 3A, in the circuit structure of Embodiment 1 illustrated in FIG. 2, the reference voltage $V_0=0$ V is supplied to the second drain line DL2 from the second signal driver DDR2, while a voltage $V_{T1}$ is supplied to the first drain line DL1 from the first signal driver DDR1. Here, in synchronization with a gate signal from the scanning driver SDR (for example, at HIGH level), the second thin film transistor TFT2 is turned ON, the reference voltage $V_0=0$ V is applied to the second pixel electrode PX2, and then, the gate signal changes to LOW level to turn OFF the second thin film transistor TFT2, and the second pixel electrode PX2 is held at 0 V. Similarly, in synchronization with the gate signal, the first thin film transistor TFT1 is also turned ON/OFF, and the voltage $V_{T1}$ is applied to and is held at the first pixel electrode PX1. Here, output of the common electrode driver CDR is in a high impedance state, and the common electrode CT is in a floating state.

As a result, as illustrated in FIG. 3A, during the period from the time t0 to the time t1, a voltage Vpx2 at the second pixel electrode PX2 is held at the reference voltage $V_0=0$ V and a voltage Vpx1 at the first pixel electrode PX1 is held at the voltage $V_{T1}$. Further, the common electrode CT is held in a no voltage applied state. Here, an electric potential difference of $V_{T1}-V_0=V_{T1}-0$ (V) is caused between the first pixel electrode PX1 and the second pixel electrode PX2 and, as illustrated in FIG. 3B and FIG. 4, an electric field (lateral electric field) EF1 in parallel with the in-plane direction of the first substrate SUB1 is developed. This applies a lateral electric field corresponding to the electric potential difference $V_{T1}$ to the blue-phase liquid crystal LC, and image display (black display) is carried out with a transmittance $T_1$. Here, in Embodiment 1, as illustrated in FIG. 4, the lateral electric field EF1 is applied to the blue-phase liquid crystal LC, and thus, light leakage in black display maybe suppressed and the dynamic range may be improved.

During the next period from the time t1 to a time t2 (no display period or second period), a voltage $V_{T3}$ is supplied to the second drain line DL2 from the second signal driver DDR2, while the voltage $V_{T3}$ is supplied to the first drain line DL1 from the first signal driver DDR1. Here, in synchronization with a gate signal from the scanning driver SDR, the first thin film transistor TFT1 and the second thin film transistor TFT2 are turned ON/OFF, and the voltage $V_{13}$ is applied to and is held at the first pixel electrode PX1 and the second pixel electrode PX2. Here, output of the common electrode driver CDR is the reference voltage $V_0=0$ V, and 0 V is applied to the common electrode CT.

As a result, during the period from the time t1 to the time t2, the voltages Vpx1 and Vpx2 at the first pixel electrode PX1 and the second pixel electrode PX2, respectively, are held at the same voltage $V_{T3}$. Further, the voltage Vc at the common electrode CT is the reference voltage $V_0=0$ V, which is held during the period from the time t1 to the time t2. This causes a state in which no electric field is applied between the first pixel electrode PX1 and the second pixel electrode PX2 as illustrated in FIG. 3C and FIG. 5. Meanwhile, an electric potential difference of $V_{T3}-V_0=V_{T3}-0$ (V) is caused between the first pixel electrode PX1 and the common electrode CT and between the second pixel electrode PX2 and the common electrode CT, and an electric field (longitudinal electric field) EF2 in the out-of-plane direction of (which is in a direction of the normal to) the first substrate SUB1 is developed. In other words, during the period in which the longitudinal electric field is applied, the lateral electric field EF1 which is an electric field in the in-plane direction of the first substrate SUB1 is not applied and the longitudinal electric field EF2 is applied, and therefore, the orientation state of the blue-phase liquid crystal LC during the previous period caused by the application of the electric potential difference $V_{T1}$ may be promptly changed to the orientation state corresponding to the longitudinal electric field applied by the voltage $V_{T3}$. This enables change of the orientation of the blue-phase liquid crystal LC at higher response speed than in a case in which a lateral electric field is applied to the blue-phase liquid crystal LC so that the electric potential difference between the first pixel electrode PX1 and the second pixel electrode PX2 is $V_{T3}$. The voltage $V_{T3}$ here is a voltage which is lower than a voltage $V_{T2}$ to be applied in order to obtain a transmittance $T_2$ during a period from the time t2 to a time t3 as the subsequent display period. In particular, the voltage $V_{13}$ is a voltage which is lower than a voltage to be applied in order to obtain the transmittance $T_2$ when the voltage becomes lower in the hysteresis characteristics.

During a next period from the time t2 to a time t3 (image display period or first period), the reference voltage $V_0=0$ V is supplied to the second drain line DL2 from the second signal driver DDR2, while the voltage $V_{T2}$ is supplied to the first drain line DL1 from the first signal driver DDR1. Here, in synchronization with a gate signal from the scanning driver SDR, the second thin film transistor TFT2 is turned ON/OFF and the reference voltage $V_0=0$ V is applied to and is held at the second pixel electrode PX2, and the first thin film transistor TFT1 is also turned ON/OFF and the voltage $V_{T2}$ is applied to and is held at the first pixel electrode PX1. Here, output of the common electrode driver CDR is in a high impedance state, and the common electrode CT is in a floating state.

As a result, during the period from the time t2 to the time t3, the voltage Vpx2 at the second pixel electrode PX2 is held at the reference voltage $V_0=0$ V and the voltage Vpx1 at the first pixel electrode PX1 is held at the voltage $V_{T2}$. Further, the common electrode CT is held in a no voltage applied state. Here, an electric potential difference of $V_{T2}-V_0=V_{T2}-0$ (V) is caused between the first pixel electrode PX1 and the second pixel electrode PX2 and, as illustrated in FIG. 3D and FIG. 4, the lateral electric field EF1 is developed. This applies a lateral electric field of the voltage of $V_{T2}$ to the blue-phase liquid crystal LC, and image display is carried out with the transmittance $T_2$. Here, the voltage Vpx2 at the second pixel electrode PX2 is the voltage $V_{T2}$ which is necessary for obtaining the transmittance $T_2$ on the rising edge.

After the time t3, also, a period during which the longitudinal electric field EF2 is applied is provided in succession between a period during which previous image display is carried out and a period during which subsequent image display is carried out.

As described above, in the liquid crystal display panel according to Embodiment 1, there are provided an image display period during which, by the lateral electric field EF1 developed by supplying the voltage corresponding to image display to the first pixel electrode PX1 and the second pixel electrode PX2, the blue-phase liquid crystal LC is modulated to carry out desired gray scale display, and a no display period during which, when image display is carried out with a smaller transmittance during the subsequent image display period, the reference voltage is applied to the common electrode CT similarly to the case of the previous image display period and a voltage which corresponds to a transmittance smaller than the transmittance during the subsequent image display period is supplied to the first pixel electrode PX1 and the second pixel electrode PX2. In other words, in the liquid crystal display device according to Embodiment 1, image display is carried out in succession with an image display period during which the lateral electric field is applied to the blue-phase liquid crystal and a no display period subsequent to the image display period, during which the longitudinal electric field is applied to the blue-phase liquid crystal LC. Further, during the no display period, voltages are applied to the first pixel electrode PX1, the second pixel electrode PX2, and the common electrode CT so that the electric potential difference between the first and second pixel electrodes PX1 and PX2 and the common electrode CT is smaller than the electric potential difference between the first pixel electrode PX1 and the second pixel electrode PX2 with the transmittance during the subsequent image display period. Therefore, in the respective image display periods, the voltages supplied to the first pixel electrode PX1 and the second pixel electrode PX2 do not depend on the display brightness (transmittance) during the previous image display period (that is, do not depend on the hysteresis characteristics when the voltage applied to the blue-phase liquid crystal LC becomes higher and lower), and image display may be carried out only by supplying the voltage applied when the transmittance becomes higher. As a result, during image display periods in succession, the blue-phase liquid crystal LC is always driven with the response time when the transmittance becomes higher, and thus, the response times with regard to the respective image display periods may be caused to be higher.

EXAMPLE

As an example of the liquid crystal display device according to Embodiment 1, a glass substrate having a thickness of 0.7 mm was used as the first substrate SUB1 and the second substrate SUB2, and the thin film transistors TFT1 and TFT2 in which amorphous silicon was used as a semiconductor layer thereof were formed on the liquid crystal surface side of the first substrate SUB1. Further, as the first pixel electrode PX1 and the second pixel electrode PX2 electrically connected to the source electrodes of the thin film transistors TFT1 and TFT2, respectively, for example, linear electrodes the material of which is chromium molybdenum and which have a width of 10 μm were formed so as to be in parallel with each other. Further, the common electrode CT which was made of ITO and which was plate-like was formed on the liquid crystal surface side of the second substrate SUB2 so as to cover the display region of the second substrate SUB2. Further, the insulating film PAS was made of silicon nitride and had a thickness of 0.8 μm.

Further, polymer beads having a diameter of 25 μm were dispersed between the first substrate SUB1 and the second substrate SUB2 to keep constant the gap of the liquid crystal layer which was formed of the blue-phase liquid crystal LC. However, the structure to keep constant the gap is not limited to the beads, and other structures such as columnar spacers may also be used. Further, the thickness of the liquid crystal layer maybe arbitrary insofar as the desired electrooptic characteristics may be obtained, and is not limited to 25 μm. As the blue-phase liquid crystal LC, polymer stabilized blue-phase liquid crystal was sandwiched in the liquid crystal layer.

The polymer stabilized blue-phase liquid crystal LC was formed by mixing equal mols of nematic liquid crystal JC1041XX (manufactured by Chisso Corporation) and 4-pentyl-4'-cyanobiphenyl (5CB) (manufactured by Aldrich). Further, as a chiral dopant, 7.0 mol % of ZLI4572 (manufactured by Merck) was added. A mixed monomer in which 2-ethylhexyl acrylate (EHA) (manufactured by Aldrich) and RM257 (manufactured by Merck) were mixed at a ratio of 7:3 was adjusted so as to be 6.3 mol %. As a photo polymerization initiator, 10 wt % of 2,2-dimethoxyphenylacetophenone (DMPAP) (manufactured by Aldrich) with respect to the monomer content was added, and heating was carried out for homogenization. Further, ultraviolet light of 365 nm was applied at 1,800 mJ. By forming polymer chains, the polymer stabilized blue-phase liquid crystal LC was manufactured.

Figure 6:
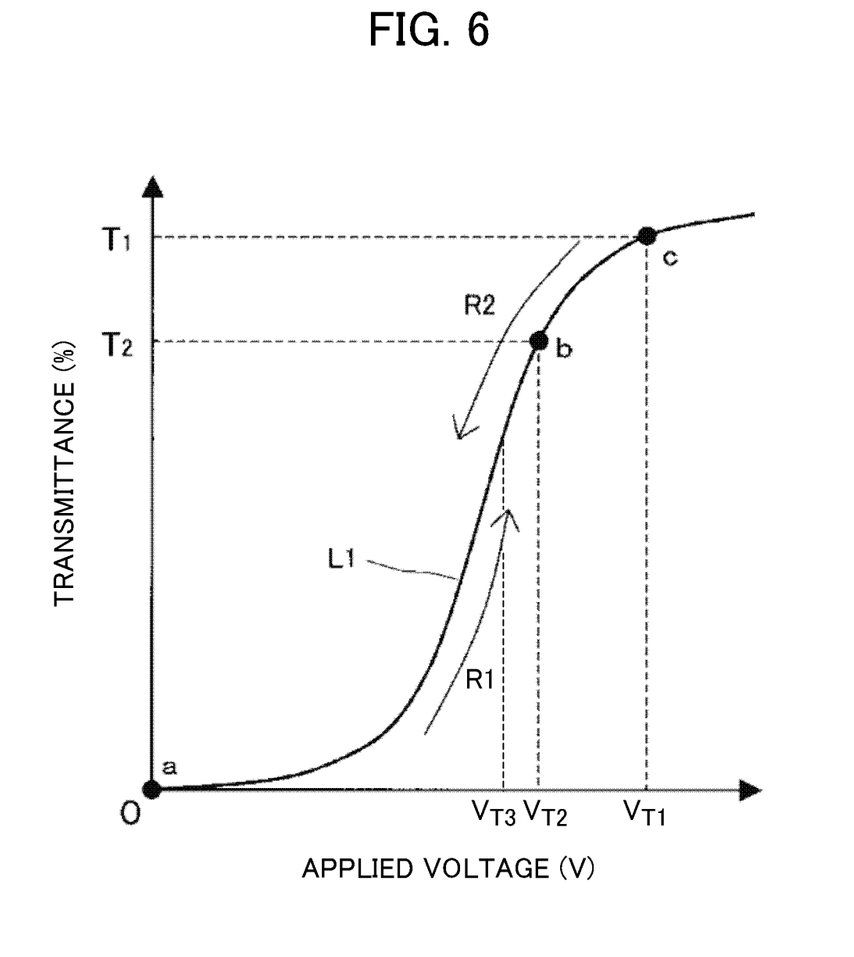
FIG. 6 is a graph illustrating characteristics between an applied voltage V and a transmittance T (V-T characteristics) in the liquid crystal display device.

In the liquid crystal display device of Example 1 structured in this way, as illustrated in FIG. 6 as a graph of V-T characteristics in which measurements of a transmittance T are plotted versus an applied voltage V in a display period, when attention is given only to voltage applied during display periods (periods of t0 to t1 and t2 to t3) excluding the no display period (period of t1 to t2), a graph L1 of the transmittance T versus the voltage V applied between the first pixel electrode PX1 and the second pixel electrode PX2 exhibits V-T characteristics without hysteresis. More specifically, both in the case in which the voltage V applied between the first pixel electrode PX1 and the second pixel electrode PX2 was gradually caused to be higher from 0 (V) to the voltage $V_{T1}$ as denoted by an arrow R1 and in the case in which the applied voltage V was gradually caused to be lower from the voltage $V_{T1}$ to 0 (V) as denoted by an arrow R2, the applied voltage V for obtaining a desired transmittance T during the display period could be one fixed voltage V.

In this way, by providing a no display period between a display period (transmittance $T_1$) and the next display period (transmittance $T_2 < T_1$) and, during the no display period, by applying the voltage $V_{T3}$ which corresponds to the transmittance lower than $T_2$, it becomes possible to set the voltage transition applied to the polymer stabilized blue-phase liquid crystal LC during the next display period to the direction illustrated by the arrow R1, and the applied voltage V for obtaining a desired transmittance during the display period may be fixed.

Figure 7:
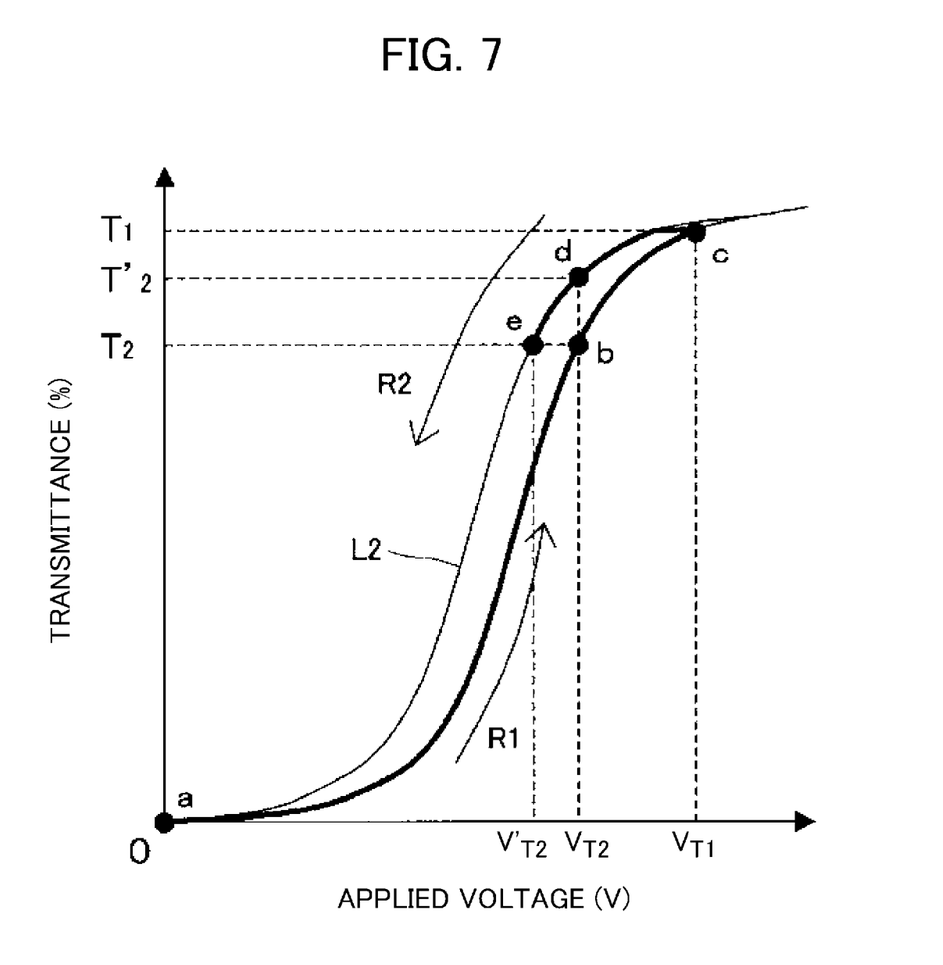
FIG. 7 is a graph illustrating hysteresis caused in the characteristics between the applied voltage V and the transmittance T (V-T characteristics) in a liquid crystal display device using blue-phase liquid crystal.

Meanwhile, FIG. 7 is a graph illustrating hysteresis caused in the V-T characteristics in which measurements of the transmittance T are plotted versus the applied voltage V in a liquid crystal display device using polymer stabilized blue-phase liquid crystal as the liquid crystal layer. The liquid crystal display device having the V-T characteristics illustrated in FIG. 7 controls the transmittance (optical transmittance) T of the polymer stabilized blue-phase liquid crystal through changing the voltage V applied to the polymer stabilized blue-phase liquid crystal LC by causing the common electrode CT to be in a no voltage applied state, always applying the reference voltage $V_0$ to the second pixel electrode PX2, and gradually changing the voltage applied to the first pixel electrode PX1. The blue-phase liquid crystal LC is driven only by the lateral electric field.

In the liquid crystal display device using the polymer stabilized blue-phase liquid crystal which has the hysteresis illustrated in FIG. 7, as is clear from a graph L2, different characteristics are exhibited between a case in which the applied voltage becomes gradually higher as denoted by the arrow R1 and a case in which the applied voltage becomes gradually lower as denoted by the arrow R2. For example, when a state denoted as a point "a" (transmittance T=0 (zero)) is changed to a state denoted as a point "b" (transmittance $T=T_2$), it is necessary to cause the voltage V applied to the polymer stabilized blue-phase liquid crystal LC to be the voltage $V_{T2}$. On the other hand, in order to obtain the same transmittance T as that of the point "b" (=$T_2$) from a state denoted as a point "c" at which the transmittance is the transmittance $T_1$, it is necessary to cause the voltage V applied to the polymer stabilized blue-phase liquid crystal LC to be a voltage $V'_{T2}$. Here, when the applied voltage V is the voltage $V_{T2}$ which is the same as the voltage when the state is changed from the point "a" to the point "b", the transmittance is as illustrated by a point "d", that is, the transmittance T on the falling edge (=$T'_2$), which is higher than the transmittance $T_2$.

On the other hand, in the liquid crystal display device according to Embodiment 1 of the present invention, the V-T characteristics during the display period with regard to the polymer stabilized blue-phase liquid crystal LC is as illustrated by the graph L1, and thus when, for example, the state is changed from the point "a" (transmittance T=0 (zero)) to the point "b" (transmittance T=$T_2$), the voltage V applied to the polymer stabilized blue-phase liquid crystal LC during the display period is caused to be the voltage $V_{T2}$. In order to obtain the transmittance $T_2$ at the point "b" from the state denoted as the point "c" at which the transmittance is the transmittance $T_1$, also, by causing the voltage V applied to the polymer stabilized blue-phase liquid crystal LC during the display period to be the voltage $V_{T2}$, display with the transmittance T=$T_2$ may be carried out.

However, in the liquid crystal display device according to Embodiment 1, the voltage applied to the common electrode CT during the no display period (t1 to t2) is not limited to the reference voltage $V_0$=0 V, and may be other than the reference voltage $V_0$. In this case, by changing the voltage $V_{T3}$ applied to the first pixel electrode PX1 and the second pixel electrode PX2 during the no display period (t1 to t2) in accordance with the voltage Vc applied to the common electrode CT so that the electric potential difference therebetween is $V_{T3}$, the effects described above may be obtained.

[Embodiment 2]

Figure 8:
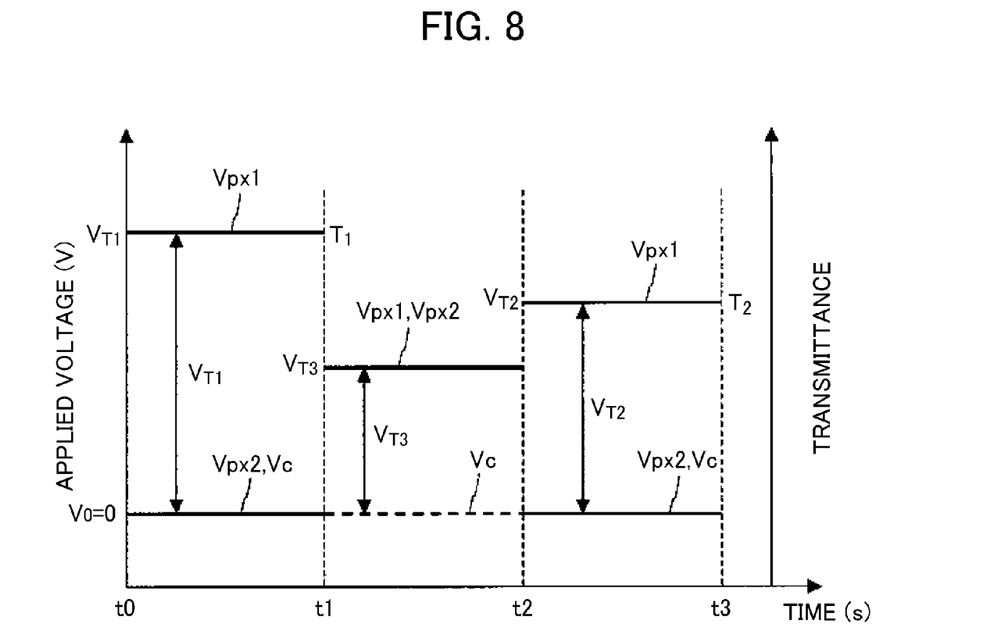
FIG. 8 is an explanatory view of operation when voltages are applied to respective electrodes in a liquid crystal display device according to Embodiment 2 of the present invention.

FIG. 8 is an explanatory view of operation when voltages are applied to respective electrodes in a liquid crystal display device according to Embodiment 2. In the liquid crystal display device according to Embodiment 2, the common electrode CT is held at a fixed voltage not only when the longitudinal electric field is applied but also when the lateral electric field is applied. In the liquid crystal display device according to Embodiment 2, a case in which the reference voltage $V_0$=0 V is applied to the common electrode CT is described. Note that, the liquid crystal display device according to Embodiment 2 is different from that according to Embodiment 1 in that the common electrode driver CDR always outputs the reference voltage $V_0$ to the common electrode CT, but is otherwise structured similarly to that according to Embodiment 1. Therefore, in the following description, display operation when the common electrode CT is held at the reference voltage $V_0$ is described in detail.

In the liquid crystal display device according to Embodiment 2, during the period from the time t0 to the time t1 illustrated in FIG. 8, the reference voltage $V_0$=0 V is applied to the common electrode CT. Here, the voltage $V_1$ corresponding to the transmittance $T_1$ is applied to the first pixel electrode PX1 while the reference voltage $V_0$=0 V is applied to the second pixel electrode PX2. This causes the voltage Vpx0 at the first pixel electrode PX1 to be $V_{T1}$, the voltage Vpx2 at the second pixel electrode PX2 to be 0 V, and the voltage Vc at the common electrode CT to be 0 V. Here, similarly to the case of Embodiment 1 described above, in the liquid crystal display device according to Embodiment 2, also, the distance d2 between the first and second pixel electrodes PX1 and PX2 and the common electrode CT is formed to be larger than the distance d1 between the first pixel electrode PX1 and the second pixel electrode PX2. Therefore, the lateral electric field by the electric potential difference $V_{T1}$ between the first pixel electrode PX1 and the second pixel electrode PX2 acts stronger than the longitudinal electric field by the electric potential difference $V_{T1}$ between the first pixel electrode PX1 and the common electrode CT on the blue-phase liquid crystal LC, and thus the pixel display is carried out with the transmittance $T_1$ in accordance with the lateral electric field.

During the period from the time t1 to the time t2, similarly to the case of Embodiment 1, the voltages Vpx1 and Vpx2 at the first pixel electrode PX1 and the second pixel electrode PX2, respectively, are held at the same voltage $V_{T3}$, and the voltage Vc at the common electrode CT is held at the reference voltage $V_0$=0 (V). Therefore, no lateral electric field is applied between the first pixel electrode PX1 and the second pixel electrode PX2, while the longitudinal electric field by the electric potential difference $V_{T3}$ is developed between the first pixel electrode PX1 and the common electrode CT and between the second pixel electrode PX2 and the common electrode CT. As a result, the orientation state of the blue-phase liquid crystal LC during the previous period caused by the application of the electric potential difference $V_{T1}$ may be promptly changed to the orientation state corresponding to the longitudinal electric field applied by the voltage $V_{T3}$, and the orientation of the blue-phase liquid crystal LC may be changed at higher response speed than in a case in which only the lateral electric field is applied by the voltage $V_{T3}$ to the blue-phase liquid crystal LC.

During the next period from the time t2 to the time t3, the reference voltage $V_0$=0 V is applied to the common electrode CT, the voltage $V_{T2}$ corresponding to the transmittance $T_2$ is applied to the first pixel electrode PX1, and the reference voltage $V_0$=0 V is applied to the second pixel electrode PX2. This causes the voltage Vpx1 at the first pixel electrode PX1 to be $V_{T2}$, the voltage Vpx2 at the second pixel electrode PX2 to be 0 V, and the voltage Vc at the common electrode CT to be 0 V. Therefore, the lateral electric field by the electric potential difference $V_{T2}$ between the first pixel electrode PX1 and the second pixel electrode PX2 acts stronger than the longitudinal electric field by the electric potential difference $V_{T2}$ between the first pixel electrode PX1 and the common electrode CT on the blue-phase liquid crystal LC, and thus the pixel display is carried out with the transmittance $T_2$ in accordance with the lateral electric field.

As described above, in the liquid crystal display device according to Embodiment 2, a fixed voltage is applied to the common electrode CT, and thus, in addition to the effects of the liquid crystal display device according to Embodiment 1, an extra effect that the common electrode driver CDR may be formed with a simple structure may be obtained.

However, in the liquid crystal display device according to Embodiment 2, the voltage applied to the common electrode CT is not limited to the reference voltage $V_0$=0 V, and may be other than the reference voltage $V_0$. In this case, it is necessary to change the voltage $V_{T3}$ applied to the first pixel electrode PX1 and the second pixel electrode PX2 during the no display period (t1 to t2) in accordance with the voltage Vc applied to the common electrode CT so that the electric potential difference therebetween is $V_{T3}$.

Note that, in the liquid crystal display device according to Embodiment 2, the voltage Vc applied to the common electrode CT during the display periods (t0 to t1 and t2 to t3) maybe different. More specifically, the voltage Vc applied to the common electrode CT during the display periods (t0 to t1 and t2 to t3) and the voltage Vc applied to the common electrode CT during the no display period (t1 to t2) may be different from one another. In this case, also, by causing the electric potential difference between the first and second pixel electrodes PX1 and PX2 and the common electrode CT during the no display period (t1 to t2) to be $V_{T3}$, the effects described in Embodiment 1 may be obtained.

In the liquid crystal display devices according to Embodiments 1 and 2 described above, the no display period (from the time t1 to the time t2) is provided after each of the image display periods (from the time t0 to the time t1 and from the time t2 to the time t3). Therefore, for example, one frame period may be divided into two periods, and one period may be a display period and the other period may be a no display period.

Note that, in the liquid crystal display devices according to Embodiments 1 and 2, application of the longitudinal electric field during the no display period may be carried out only with regard to a pixel the transmittance of which during the subsequent image display period becomes lower than that during the present image display period.

The present invention made by the inventors is specifically described in the above based on the embodiments of the present invention, but the present invention is not limited to the embodiments above and various modifications are possible which fall within the gist of the present invention.

What is claimed is:

1. A liquid crystal display device, comprising:
   a first substrate including pixels arranged in matrix, the pixels each including a first electrode and a second electrode, the first electrode and the second electrode each including a plurality of linear electrodes and formed so as to be comb-like;
   a second substrate arranged so as to be opposed to the first substrate via a blue-phase liquid crystal layer;
   a backlight device for applying backlight from a rear surface side of the first substrate,
       the liquid crystal display device driving the blue-phase liquid crystal layer by an electric field developed between the first electrode and the second electrode;
   first drain lines extending in a Y direction and provided side by side in an X direction;
   second drain lines extending in the Y direction and provided side by side in the X direction;
   gate lines extending in the X direction and provided side by side in the Y direction;
   a first thin film transistor, which is provided in each of the pixels and includes a drain electrode connected to one of the first drain lines, for supplying a drain signal from the one of the first drain lines to the first electrode in synchronization with a scanning signal from one of the gate lines;
   a second thin film transistor, which is provided in each of the pixels and includes a drain electrode connected to one of the second drain lines, for supplying a drain signal from the one of the second drain lines to the second electrode in synchronization with a scanning signal from one of the gate lines; and
   a third electrode, which is plate-like and formed on the blue-phase liquid crystal layer side of the second substrate so as to cover at least a region in which the pixels are formed.

2. The liquid crystal display device according to claim 1, further comprising a drive circuit for the third electrode for switching, in synchronization with the scanning signal, between a first period during which a predetermined electric potential is supplied to the third electrode and a second period during which the third electrode is held in a floating state.

3. The liquid crystal display device according to claim 1, further comprising a drive circuit for the third electrode for holding the third electrode at a predetermined electric potential.

4. The liquid crystal display device according to claim 1, further comprising:
   a first drive circuit for supplying, in synchronization with the scanning signal, a video signal to the first drain lines; and
   a second drive circuit for controlling a voltage to be supplied to the second drain lines so as to be switched between a reference voltage which is a reference electric potential of the video signal and a video signal having the same voltage as a voltage at the first drive circuit, in synchronization with the scanning signal.

5. The liquid crystal display device according to claim 1, wherein the first thin film transistor and the second thin film transistor in each of the pixels are connected to the same gate line of the gate lines.

6. The liquid crystal display device according to claim 1, wherein:
   the first thin film transistor is formed in proximity to a region of intersection of one of the gate lines and one of the first drain lines; and
   the second thin film transistor is formed in proximity to a region of intersection of one of the gate lines and one of the second drain lines.

7. The liquid crystal display device according to claim 1, wherein the blue-phase liquid crystal layer comprises polymer stabilized blue-phase liquid crystal.

8. The liquid crystal display device according to claim 1, wherein the liquid crystal display device with the blue-phase liquid crystal layer is configured so as to compensate for hysteresis caused between a voltage applied to a pixel and a transmittance of the pixel.

9. The liquid crystal display device according to claim 8, wherein the liquid crystal display device with the blue-phase liquid crystal layer is configured to compensate for delay in a fall time of a response characteristic.

10. The liquid crystal display device according to claim 1, wherein each of a distance between the third electrode and the first electrode and a distance between the third electrode and the second electrode is larger than a distance between the first electrode and the second electrode.

11. The liquid crystal display device according to claim 1, wherein a direction of the electric field in gradation change when the voltage applied to the blue-phase liquid crystal layer becomes higher is different from a direction of the electric field in gradation change when the voltage applied to the blue-phase liquid crystal layer becomes lower.

12. A liquid crystal display device, comprising:
   a first substrate including pixels arranged in matrix, the pixels each including a first electrode and a second electrode, the first electrode and the second electrode each including a plurality of linear electrodes and formed so as to be comb-like;
   a second substrate arranged so as to be opposed to the first substrate via a blue-phase liquid crystal layer; and
   a backlight device for applying backlight from a rear surface side of the first substrate,
       the liquid crystal display device driving the blue-phase liquid crystal layer by an electric field developed between the first electrode and the second electrode, wherein:
   the second substrate comprises a third electrode, which is plate-like and formed on the blue-phase liquid crystal layer side of the second substrate so as to cover at least a region in which the pixels are formed; and
   the liquid crystal display device further comprises a drive circuit for modulating and driving the blue-phase liquid crystal layer by sequentially switching between:
       a first period during which the drive circuit applies voltages to the first electrode and the second electrode to develop an electric field in parallel with an in-plane direction of the first substrate, thereby modulating and driving the blue-phase liquid crystal layer correspondingly to a display image; and a second period during which the drive circuit applies substantially the same voltage to the first electrode and the second electrode and applies a predetermined voltage to the third electrode to develop an electric field in parallel with a normal to the first substrate, thereby modulating and driving the blue-phase liquid crystal layer.

13. The liquid crystal display device according to claim 12, wherein an electric potential difference between the third electrode and the first electrode as well as the second electrode during the second period is controlled to be an electric potential difference which corresponds to a transmittance which is lower than a transmittance of the pixel in a first period which is subsequent to the second period.

14. The liquid crystal display device according to claim 12, wherein:
 during the first period, a direction of orientation of the blue-phase liquid crystal layer is caused to be uniform by a lateral electric field formed between the first electrode and the second electrode; and
 during the second period, the orientation of the blue-phase liquid crystal layer during the first period is returned to an original state by a longitudinal electric field formed between the third electrode and the first electrode as well as the second electrode.

\* \* \* \* \*